United States Patent Office
2,812,234
Patented Nov. 5, 1957

2,812,234
TITANATE COMPOSITIONS

Preston Robinson, Williamstown, Mass., assignor to Sprague Electric Company, North Adams, Mass., a corporation of Massachusetts No Drawing. Application November 23, 1953,
Serial No. 393,927

6 Claims. (Cl. 23—51)

The present invention relates to a new class of dielectric titanate compositions.

During the past several years, a great deal of interest has been shown in compounds, such as barium titanate, which are both dielectric and ferroelectric in character. These compounds are presently being used in ceramics employed as transducers for ultrasonic work, for phonograph pick-ups and the like, in addition to being used as dielectrics for capacitors and related devices. In these applications they are extremely advantageous because of their high dielectric constant, as well as the fact that they may readily be polarized with an electrical field.

In the course of development work in producing various titanate bodies of the class indicated, it has been found for many applications that the existing titanates do not possess ferroelectric and/or dielectric properties which can be controlled to the desired extent for some exacting applications. It is an object of the present invention to produce various titanate ferroelectrics which possess high dielectric constants which can be used for such exacting applications. Further objects of the invention, as well as the advantages of it, will be apparent from the body of the specification, as well as the appended claims.

Broadly, it has been found that titanate dielectric ceramic compositions can be formed in accordance with this invention having controlled properties by substituting for the divalent ion normally found in such ceramic compositions equal stoichiometric parts of cesium and of at least one ion selected from the group consisting of lanthanum, scandium, and yttrium ions.

Within the broad scope of the present invention, ceramic materials can be formed in which one ion selected from each of the two groups indicated can be used as complete replacement for the divalent ions normally employed in titanates or in which such ions can be substituted in part for such divalent ions. The precise degree of replacement will depend upon the final properties desired in the dielectric composition produced and these in turn will, of course, be governed by the application of the material. The term "divalent ion" as used herein refers to the calcium, strontium, barium, or similar ions which are normally found in titanates. The present disclosure contemplates the replacement of such divalent ions in either single titanate compounds or within various mixed crystal titanates, such as are described in the Wainer Patents Nos. 2,467,169, 2,436,840, or 2,420,692.

The procedure employed in forming the new compositions of the present invention is comparatively simple in nature. The various oxides, hydroxides, oxalates, or carbonates of cesium, lanthanum, yttrium, and scandium can be admixed together with approximately the stoichiometric parts of titanium dioxide and the resultant mixture can be pressed into a pellet which is preferably fired within the temperature range of from 1400 to 2000° C. until such time as a coherent ceramic body is formed. The admixture of the various ingredients is conveniently carried out by ball-milling them together for a period of 24 to 48 hours. Frequently, the formation of the dielectrics of the instant invention is aided with the addition of up to 10% by weight of a volatile flux compound, such as for example, sodium fluoride, potassium fluoride, or lithium fluoride, which vaporizes at the elevated temperatures employed after aiding in the fusion of the ingredients of the specific dielectrics. If desired, binder materials, such as potato starch, tragacanth, gum arabic, or the like, can be used to hold the individual ingredients together prior to the firing step. It is to be understood that the instant invention includes fusing the individual ingredients together by other means besides conventional ovens. Thus, for example, a common blow-torch can be used satisfactorily to form what may be loosely termed a single crystalline body. Single crystals of the compositions herein described can be grown by melting the ingredients together in an appropriate container for an extended period at temperatures of from 2200 to 2600° C. and then cooling at the rate of 10° per hour until the mass has reached about 600° C. at which time the entire mixture may be cooled rapidly at room temperature.

As a specific example indicating an embodiment of this invention, 1 mol of cesium carbonate, 1 mol of lanthanum oxide, and 6 mols of titanium dioxide and 2 mols of barium oxide were ground together into fine form and thereafter pressed into pellets under a pressure of 20,000 pounds per square inch. The pellets were fired in an atmosphere of 1430° C. for one hour after which they were found to be porous, flaky, and readily susceptible to fracture and exhibited an X-ray pattern which was indistinct containing lines of all the various components. Thereafter these fired pellets were broken up and ground by means of a mortar and pestle and thereafter repressed and refired at 1430° C. for 1 hour. The fired pellets resulting therefrom had a coherent porous structure that upon X-ray analysis showed a pattern indicative of the perovskite structure. It is preferred to fire these compressed pellets upon a material of low activity such as platinum so as to avoid contamination of the ceramic body or reaction with the components of the ceramic body during the firing process. Where it is desired to obtain a more compact nonporous structure, firing should be within the temperature range of from 1600 to 2000° C. for periods of substantially one hour. The latter structure exhibits minimized aging of the dielectric constant characteristics which is a distinct advantage over presently known high dielectric constant materials. Thus a capacitor can be fabricated from this dielectric material and exhibit unusual constancy in capacitance over long periods of time.

When the above procedure is modified by omitting the barium oxide reactant and using 4 mols of titanium dioxide in place of the 6 mols used in the reference example, cesium lanthanum titanate is obtained. In this procedure it is preferable to fire the reaction mixture at 1800° C. for about 1 hour instead of using the lower temperatures of the reference example.

Some satisfactory dielectrics falling within the scope of the present invention are cesium lanthanum titanate, cesium lanthanum barium titanate in which 25% of the barium ions have been replaced by cesium and 25% by lanthanum; cesium lanthanum strontium titanate in which 40% of the strontium ions have been replaced by cesium and 40% by lanthanum; cesium lanthanum calcium titanate in which 10% of the calcium ions have been replaced by cesium and 10% by lanthanum; cesium yttrium barium titanate in which 2% of the barium ions have been replaced by yttrium and 2% have been replaced by cesium; cesium scandium barium titanate in which 2% of the barium ions have been replaced by scandium and 2% have been replaced by cesium.

The replacement of the divalent ion of the perovskite crystal structure, with two ions having an average ionic radius comparable to that of the replaced divalent ion is susceptible to further expansion than that heretofore discussed. For example, the monovalent cesium ion can be replaced with such ions as potassium, rubidium, lithium, and sodium. When these ions are utilized with the trivalents, scandium, or yttrium, such substitution results in an average ionic radius which approximates that of the divalent ion which they replaced. Some satisfactory dielectrics falling within the scope of this latter discussion are potassium scandium barium titanate; rubidium yttrium strontium titanate; lithium yttrium titanate and sodium scandium barium titanate.

As many apparently widely different embodiments of my invention may be made without departing from the spirit and scope hereof, it is to be understood that my invention is not limited to the specific embodiment hereof except as defined in the appended claims.

What is claimed is:

1. A ferroelectric body comprising a titanate including equal stoichiometric parts of cesium ions and an ion selected from the group consisting of scandium, yttrium, and lanthanum ions.
2. Cesium lanthanum titanate.
3. A cesium lanthanum barium titanate.
4. A barium titanate containing dielectric composition in which a part of the divalent barium ions have been replaced by equimolecular amounts of cesium and a trivalent ion of the group consisting of scandium, yttrium and lanthanum.
5. A barium titanate containing dielectric composition in which a part of the divalent barium ions have been replaced by stoichiometrically equal parts of cesium and lanthanum ions.
6. A titanate dielectric composition containing ions selected from the group consisting of calcium, strontium, and barium wherein at least part of said ions have been replaced by stoichiometrically equal amounts of lanthanum and cesium.

References Cited in the file of this patent

UNITED STATES PATENTS

| 2,507,253 | Howatt | May 9, 1950 |
| 2,520,376 | Roup et al. | Aug. 29, 1950 |
| 2,563,307 | Burnham et al. | Aug. 7, 1951 |

FOREIGN PATENTS

| 466,210 | Canada | June 27, 1950 |
| 574,577 | Great Britain | Jan. 11, 1946 |
| 650,099 | Great Britain | Feb. 14, 1951 |